United States Patent
Ikeda

(10) Patent No.: US 12,097,626 B2
(45) Date of Patent: Sep. 24, 2024

(54) ARTICLE PICKUP SYSTEM, ARTICLE PICKUP ROBOT, ARTICLE PICKUP METHOD, AND ARTICLE PICKUP PROGRAM

(71) Applicant: TOYOTA JIDOSHA KABUSHIKI KAISHA, Toyota Aichi-ken (JP)

(72) Inventor: Koichi Ikeda, Nagoya Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 17/699,742

(22) Filed: Mar. 21, 2022

(65) Prior Publication Data

US 2022/0305664 A1   Sep. 29, 2022

(30) Foreign Application Priority Data

Mar. 24, 2021   (JP) .................................. 2021-049876

(51) Int. Cl.
*B25J 9/16* (2006.01)
*B25J 5/00* (2006.01)

(52) U.S. Cl.
CPC ............. *B25J 9/1697* (2013.01); *B25J 5/007* (2013.01); *B25J 9/1679* (2013.01)

(58) Field of Classification Search
CPC ........ B25J 9/1697; B25J 5/007; B25J 9/1679; B25J 9/162; B25J 19/023; G05B 2219/45063; G05B 2219/45084
See application file for complete search history.

(56) References Cited

U.S. PATENT DOCUMENTS

| | | | | |
|---|---|---|---|---|
| 9,687,983 | B1 * | 6/2017 | Prats | B25J 9/1612 |
| 9,691,151 | B1 * | 6/2017 | Anderson-Sprecher | G06T 7/251 |
| 10,025,886 | B1 * | 7/2018 | Rublee | G01B 11/254 |
| 10,449,671 | B2 * | 10/2019 | Michalakis | B25J 9/161 |
| 10,546,196 | B2 * | 1/2020 | Witt | G06F 18/231 |
| 10,572,775 | B2 * | 2/2020 | Greenberg | G06N 3/045 |
| 11,093,896 | B2 * | 8/2021 | Perrella | G06F 16/2246 |
| 11,338,429 | B2 * | 5/2022 | Park | B25J 11/0005 |
| 11,372,408 | B1 * | 6/2022 | Webster | G05D 1/0212 |
| 11,904,481 | B2 * | 2/2024 | Yamamoto | B25J 9/163 |

(Continued)

FOREIGN PATENT DOCUMENTS

| | | |
|---|---|---|
| JP | 2010-264553 A | 11/2010 |
| JP | 2018-530089 A | 10/2018 |

(Continued)

*Primary Examiner* — Sze-Hon Kong
(74) *Attorney, Agent, or Firm* — Dinsmore & Shohl LLP

(57) ABSTRACT

The article pickup system includes: a camera that is provided in a mobile body capable of moving in an environment where a plurality of articles to be picked up are present and that acquires image data by capturing the plurality of articles; and an article pickup robot that moves in the environment and picks up the plurality of captured articles. The article pickup robot includes: a camera position acquisition unit that detects the camera and then acquires position information of the camera; an article position specification unit that specifies positions of the plurality of articles based on the position information of the camera; a mobile unit that moves to the specified positions; and a pickup unit that picks up the plurality of articles at the positions to which the mobile unit has moved.

15 Claims, 7 Drawing Sheets

(56) References Cited

U.S. PATENT DOCUMENTS

| | | | |
|---|---|---|---|
| 12,005,578 B2* | 6/2024 | Mahmood | G06N 20/00 |
| 2006/0112034 A1* | 5/2006 | Okamoto | G05D 1/0274 |
| | | | 706/16 |
| 2006/0195226 A1* | 8/2006 | Matsukawa | B25J 9/162 |
| | | | 700/245 |
| 2012/0072023 A1* | 3/2012 | Ota | B25J 9/1664 |
| | | | 901/1 |
| 2019/0066485 A1* | 2/2019 | Roberts | G08B 13/1965 |
| 2019/0369641 A1* | 12/2019 | Gillett | B62D 57/028 |
| 2020/0016767 A1* | 1/2020 | Song | B25J 13/06 |
| 2020/0117898 A1* | 4/2020 | Tian | G06F 3/04815 |
| 2020/0316786 A1* | 10/2020 | Galluzzo | B25J 9/162 |
| 2020/0333789 A1* | 10/2020 | Suzuki | G01S 17/89 |
| 2020/0376656 A1 | 12/2020 | Berkowitz et al. | |
| 2021/0220997 A1* | 7/2021 | Unno | B25J 9/1694 |
| 2021/0268659 A1* | 9/2021 | Olmstead | B25J 9/1697 |
| 2021/0308867 A1* | 10/2021 | Kikkawa | B25J 9/1653 |
| 2022/0001535 A1* | 1/2022 | Anderson-Sprecher | |
| | | | G06V 20/10 |
| 2022/0168893 A1* | 6/2022 | Hamilton | B25J 9/1697 |
| 2022/0193894 A1* | 6/2022 | Barry | B25J 13/006 |
| 2022/0234194 A1* | 7/2022 | Deyle | B25J 18/007 |
| 2022/0287530 A1* | 9/2022 | Xi | G06V 20/64 |
| 2022/0297300 A1* | 9/2022 | Hashiguchi | B25J 9/1697 |
| 2022/0300000 A1* | 9/2022 | Poluboiarinov | G05D 1/0238 |
| 2022/0355483 A1* | 11/2022 | Lee | B25J 9/1666 |
| 2023/0168689 A1* | 6/2023 | Szatmary | G06V 20/10 |
| | | | 701/25 |
| 2024/0118667 A1* | 4/2024 | Rao | B25J 9/1697 |

FOREIGN PATENT DOCUMENTS

| | | |
|---|---|---|
| JP | 6402266 B1 | 10/2018 |
| WO | 2017/044851 A1 | 3/2017 |

* cited by examiner

ARTICLE PICKUP SYSTEM, ARTICLE PICKUP ROBOT, ARTICLE PICKUP METHOD, AND ARTICLE PICKUP PROGRAM

CROSS REFERENCE TO RELATED APPLICATIONS

This application is based upon and claims the benefit of priority from Japanese patent application No. 2021-049876, filed on Mar. 24, 2021, the disclosure of which is incorporated herein in its entirety by reference.

BACKGROUND

The present disclosure relates to an article pickup system, an article pickup robot, an article pickup method, and an article pickup program.

A technique for controlling movement of a robot capable of moving autonomously is known. As a related technique, for example, Japanese Patent No. 6402266 discloses a movement control system including a server, a robot that travels on a floor, and a plurality of fixed cameras that are provided in a surface above the floor such as a ceiling thereof and repeatedly capture images of the floor.

In the movement control system disclosed in Japanese Patent No. 6402266, the server estimates a current position of the robot based on a plurality of images captured substantially simultaneously from different directions by the plurality of fixed cameras. Each time the server estimates the current position of the robot, the server determines whether or not the robot is in a standby state in which it waits for a movement instruction from the server. When the robot is in a standby state, the server transmits, to the robot, a movement instruction to move the robot to a first position different from the current position thereof based on the current position estimated based on the plurality of images. When the robot is not in a standby state, the server does not transmit a movement instruction.

The robot disclosed in Japanese Patent No. 6402266, for example, constantly captures a video image of the area around the robot while moving on the floor based on a movement instruction from the server, and performs operations, such as monitoring, tracking, and speaking for preventing shoplifting, and providing advertisement information to customers.

SUMMARY

It is assumed that a robot is moved by using a system as disclosed in Japanese Patent No. 6402266, and an article present on a floor surface of a room is picked up. For example, a case may be assumed in which a room cluttered with balls, blocks, or other toys is cleaned up using a robot. In such a case, when a fixed camera is attached to a surface above the floor surface such as a ceiling, there is a distance of about 2 to 3 m between the camera and the objects to be picked up. Therefore, it is required that the camera have a high resolution to recognize things like tiny toys fallen on the floor.

Further, since the fixed camera has a limited capturing range, it may be difficult to capture the entire area of the room with one camera. Even if one camera can capture the entire area of the room, an article may be in the blind spot of the camera due to furniture such as chairs and tables. The aforementioned article would not recognized by the camera. This causes a problem that all the articles are not picked up.

In order to cope with this problem, it is conceivable to increase the number of fixed cameras installed on the ceiling. By increasing the number of cameras, the entire area of the room can be captured, and the blind spot caused by furniture can be reduced. However, since it is required that the camera have a high resolution as described above, a per-unit price of the camera becomes relatively high. Thus, the cost increases when a plurality of these cameras are installed. Further, in a room where the camera is not installed, the robot cannot perform pickup processing similar to that performed in a room where the camera is installed. Therefore, when the pickup processing is performed in a plurality of rooms, it is necessary to install a plurality of cameras in each room, and thus the cost further increases. In Japanese Patent No. 6402266, the above-described problem is not taken into account.

The present disclosure has been made to solve the above-described problem and an object thereof is to provide an article pickup system, an article pickup robot, an article pickup method, and an article pickup program that are capable of efficiently picking up articles.

A first exemplary aspect is an article pickup system including:
  a camera provided in a mobile body capable of moving in an environment where a plurality of articles to be picked up are present, the camera being configured to acquire image data by capturing the plurality of articles; and
  an article pickup robot configured to move in the environment and pick up the plurality of captured articles, in which
  the article pickup robot includes:
    a camera position acquisition unit configured to detect the camera and then acquire position information of the camera;
    an article position specification unit configured to specify positions of the plurality of articles based on the position information of the camera;
    a mobile unit configured to move to the specified positions; and
    a pickup unit configured to pick up the plurality of articles at the positions to which the mobile unit has moved.

By the above configuration, it is possible to efficiently pick up articles.

Another exemplary aspect is an article pickup robot including:
  a camera position acquisition unit configured to detect a camera and then acquire position information of the camera, the camera being configured to acquire image data by capturing a plurality of articles to be picked up;
  an article position specification unit configured to specify positions of the plurality of captured articles based on the position information of the camera;
  a mobile unit configured to move to the specified positions; and
  a pickup unit configured to pick up the plurality of articles at the positions to which the mobile unit has moved,
  in which the camera is provided in a mobile body capable of moving in an environment where the plurality of articles are present.

By the above configuration, it is possible to efficiently pick up articles.

Another exemplary aspect is an article pickup method including:
  a camera position acquisition step of detecting a camera and then acquiring position information of the camera, the camera being configured to acquire image data by capturing a plurality of articles to be picked up;

an article position specification step of specifying positions of the plurality of captured articles based on the position information of the camera;

a mobile step of moving to the specified positions; and a pickup step of picking up the plurality of articles at the positions to which the mobile unit has moved, in which the camera is provided in a mobile body capable of moving in an environment where the plurality of articles are present.

By the above configuration, it is possible to efficiently pick up articles.

Another exemplary aspect is an article pickup program for causing a computer to execute:

camera position acquisition processing of detecting a camera and then acquiring position information of the camera, the camera being configured to acquire image data by capturing a plurality of articles to be picked up;

article position specification processing of specifying positions of the plurality of captured articles based on the position information of the camera;

mobile processing of moving to the specified positions; and pickup processing of picking up the plurality of articles at the positions to which the mobile unit has moved, in which the camera is provided in a mobile body capable of moving in an environment where the plurality of articles are present.

By the above configuration, it is possible to efficiently pick up articles.

The article pickup system, the article pickup robot, the article pickup method, and the article pickup program according to the present disclosure enable an efficient pickup of articles.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment will be described hereinafter with reference to the drawings.

Figure 1:
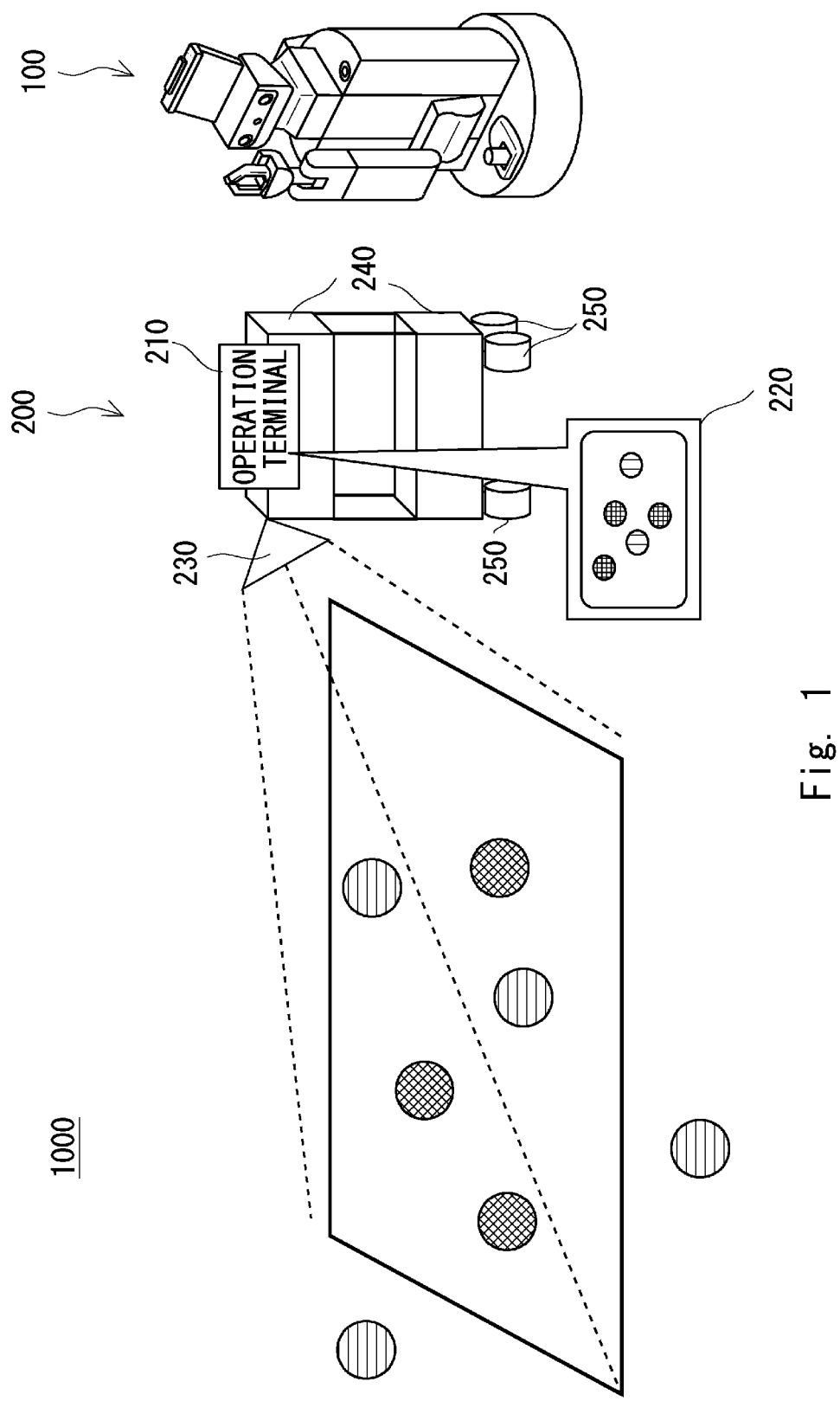
FIG. 1 is a diagram showing an overview of an article pickup system according to an embodiment.

FIG. 1 is a diagram showing an overview of an article pickup system 1000 according to this embodiment. As shown in FIG. 1, the article pickup system 1000 includes an article pickup robot 100 and a mobile body 200. The article pickup system 1000 can be used in an environment where a plurality of articles to be picked up are present. In the following description, an article to be picked up will be referred to as a pickup object. FIG. 1 shows, as an example of this embodiment, a case in which the article pickup robot 100 picks up balls fallen on a floor surface in an indoor environment.

The mobile body 200 can move in an environment where a plurality of pickup objects are present. The mobile body 200 may include, for example, a wagon including wheels on the bottom surface thereof as shown in FIG. 1. A camera 230 that captures a plurality of pickup objects and acquires image data is provided in the mobile body 200. The image data is displayed on a display unit 220 of an operation terminal 210 provided in the mobile body 200. A user can know a capturing range of the camera 230 by checking the display unit 220.

The article pickup robot 100 detects the mobile body 200 by using a sensor provided in the head part or the like thereof, and acquires position information of the mobile body 200. The article pickup robot 100 specifies a position of the captured pickup object based on the position information of the mobile body 200. The article pickup robot 100 moves to the specified position of the pickup object and picks up the pickup object by using a hand or the like provided at a front end of an arm thereof. The article pickup robot 100 stores the picked-up pickup objects in an article storage unit 240 of the mobile body 200. The article pickup robot 100 picks up one pickup object and subsequently picks up another pickup object.

In this way, the article pickup robot 100 performs article pickup processing for moving in the environment and picking up a plurality of articles.

The environment where the article pickup robot 100 performs the article pickup processing may be any environment as long as it is a space in which the article pickup robot 100 can pick up pickup objects while moving autonomously. For example, the environment where the pickup objects are present may include a room in a house, a public facility, or an office. The environment is not limited to indoors, but may be outdoors. Further, the pickup objects are not limited to balls, but may be any objects such as clothes, food, toys, stationery, cans, plastic bottles, or paper trash. The article pickup robot 100 can, for example, autonomously move in a room, and pick up these pickup objects and then put them in a predetermined pickup container. The pickup object is not limited to being present on a floor surface or the ground, but may be present on furniture such as a desk or a shelf.

Figure 2:
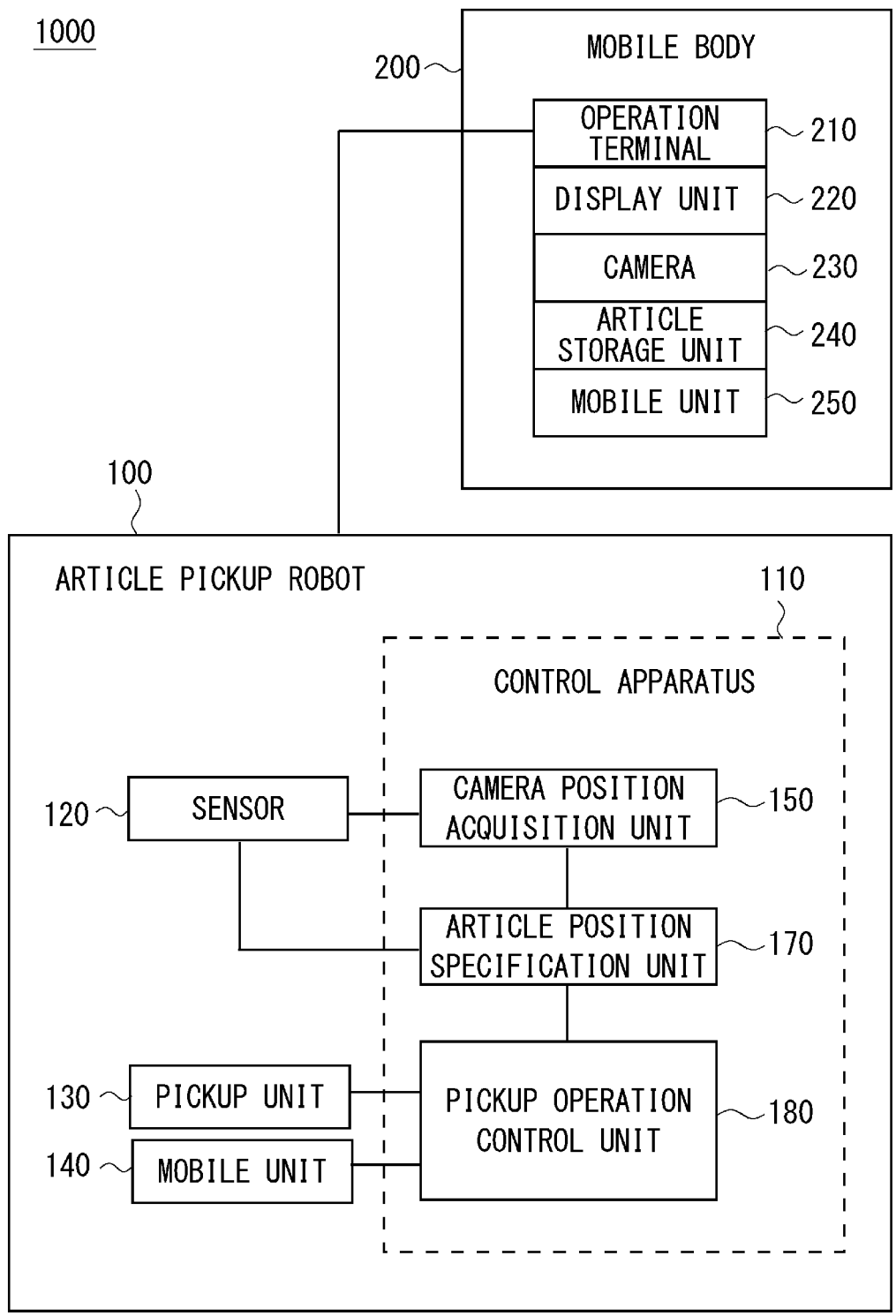
FIG. 2 is a block diagram showing a configuration of an article pickup system according to the embodiment.

FIG. 2 is a block diagram showing a configuration of the article pickup system 1000. The configuration of each of the mobile body 200 and the article pickup robot 100 included in the article pickup system 1000 will be described below.

The mobile body 200 includes the operation terminal 210, the display unit 220, the camera 230, the article storage unit 240, and a mobile unit 250. The mobile body 200 is a mobile body capable of moving in an environment where a plurality of articles to be picked up are present. The mobile body 200 may be a wagon including a basket as shown in FIG. 1, or may be a cart including a placement table on which articles are placed. A user can move the mobile body 200 in the environment, for example, by pushing or pulling the mobile body 200 by hand.

The operation terminal 210 is a communication terminal used by a user in the environment. The operation terminal 210 may include, for example, a tablet terminal, a smartphone, and a laptop computer. The operation terminal 210 is connected to the article pickup robot 100 wirelessly or by wire, and transmits and receives data to and from the article pickup robot 100. The operation terminal 210 may be connected to the article pickup robot 100 using a communication system such as Wi-Fi (registered trademark) or Bluetooth (registered trademark).

The operation terminal 210 includes the display unit 220 which is a display apparatus that displays display information received from the outside. The display unit 220 displays display information received from the camera 230 or the article pickup robot 100 through the operation terminal 210. The display information includes image data of pickup objects captured by the camera 230. The display unit 220 may include, for example, a liquid crystal display and an organic EL display. The display unit 220 may be a touch panel including an operation unit that allows a user to operate the operation terminal 210 by touching it with a finger or the like.

The display unit 220 may be movable together with the camera 230 in the environment. By the above, a user can move the mobile body 200 while checking the capturing range of the camera 230 on the display unit 220. The display unit 220 is not required to be fixed to the mobile body 200. The display unit 220 may be, for example, a display screen of a smartphone owned by a user. The display unit 220 may be a display screen of a wearable terminal or the like which can be attached to a user.

A user can instruct the article pickup robot 100 to start or end article pickup processing by using the operation terminal 210. Instructions from a user may be issued by inputting characters or pressing down a button on an operation screen displayed on the display unit 220 of the operation terminal 210. The operation terminal 210 may receive a voice input from a user and issue these instructions.

Figure 3:
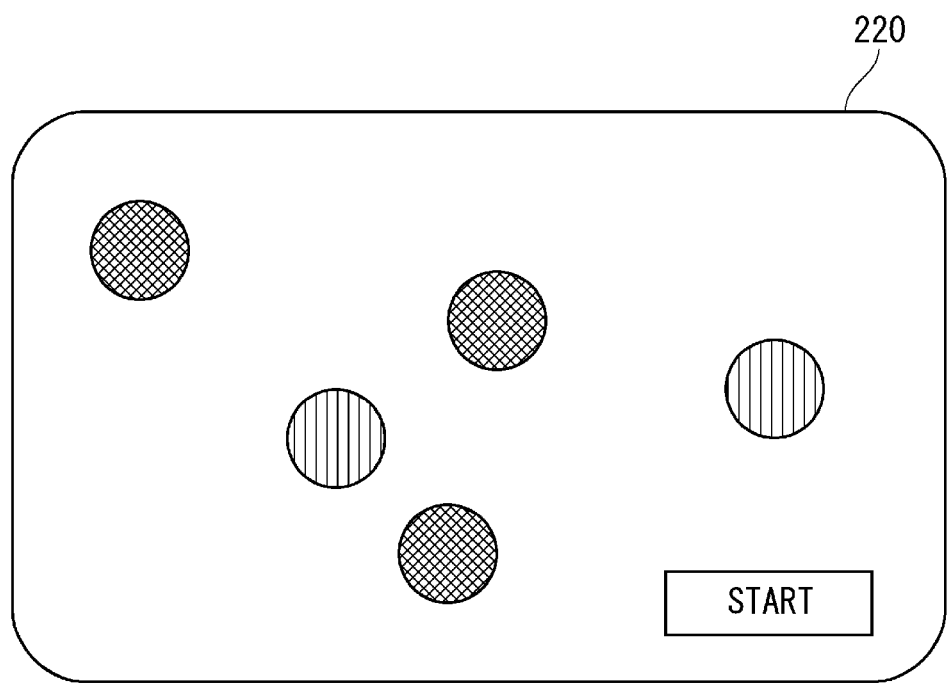
FIG. 3 is a diagram showing an example of a display screen in an operation terminal according to the embodiment.

FIG. 3 is a diagram showing an example of an operation screen displayed on the display unit 220. As shown in FIG. 3, the display unit 220 displays image data of pickup objects captured by the camera 230. The operation terminal 210 recognizes the pickup objects included in the displayed image data by using image recognition. The pickup objects may be recognized, for example, by referring to pickup object recognition image data for recognizing pickup objects stored in a storage unit (not shown) of the operation terminal 210. The pickup object recognition image data may be stored, for example, so that external appearance information including the shape, size, color, or the like of an article which may be recognized in the environment is associated with identification information for identifying the article.

The operation terminal 210 acquires position information of the recognized pickup object. The position information of the pickup object may be information indicating a position of the pickup object relative to the mobile body 200.

The operation terminal 210 displays a "start" button for starting article pickup processing together with the image data of the pickup objects as shown in FIG. 3. When a user presses down a button, the operation terminal 210 causes the article pickup robot 100 to start the article pickup processing. The operation terminal 210 transmits the position information of the pickup object relative to the mobile body 200 to the article pickup robot 100 together with the instruction for the start of the processing. The operation terminal 210 may transmit external appearance information of the pickup object including the shape, size, color, or the like of the pickup object.

The operation terminal 210 is not limited to having the above configuration, and may receive the selection of the article to be picked up from among the displayed image data from a user and instruct the article pickup robot 100 to pick up only the selected article. By the above, it is possible to avoid the pickup of articles which a user has not intended to pick up.

Further, when the operation terminal 210 detects that the pickup object is included in the capturing range of the camera 230, it may instruct the article pickup robot 100 to start the article pickup processing without waiting for an instruction from a user.

Referring back to FIG. 2, the description will be continued. The camera 230 captures a plurality of pickup objects and acquires image data. The camera 230 is fixed to the mobile body 200, and captures images in a predetermined direction at the position of the mobile body 200. The predetermined direction may be any direction in which the pickup object can be included in the capturing range of the camera 230. The predetermined direction may include, for example, a floor surface of a room and a top surface of furniture. The predetermined direction may be a direction toward a region having a height that the arm of the article pickup robot 100 can reach. The camera 230 is, for example, a two-dimensional camera. The camera 230 acquires image data and outputs it to the operation terminal 210. The camera 230 may be a three-dimensional camera or the like.

The camera 230 is fixed, for example, to the front side of the mobile body 200 in a traveling direction thereof. A user moves the mobile body 200, whereby the camera 230 can capture images in any direction. Therefore, the user can cause the camera 230 to capture the pickup object by moving the mobile body 200 to the vicinity of the pickup object which the user wants to include in the capturing range of the camera 230. As described above, by mounting the camera 230 on the mobile body 200, the pickup object can be easily recognized by the camera 230, unlike in the case in which the fixed camera is provided in a ceiling or the like.

The article storage unit 240 is a pickup container capable of storing a plurality of articles. The article storage unit 240 stores articles picked up by the article pickup robot 100. The article storage unit 240 is, for example, a box-shaped container of which the upper part is open. The article storage unit 240 is not limited to this, but may be a bag-shaped container of which the upper part is open. Further, the article storage unit 240 may be a placement table or the like on which articles can be placed. One or a plurality of article storage units 240 may be provided in the mobile body 200. Since the article pickup robot 100 moves in accordance with the position of the mobile body 200, the articles picked up by the article pickup robot 100 can be quickly stored by providing the article storage unit 240 in the mobile body 200. Thus, it is possible to reduce the time required for the entire article pickup processing.

Note that the article storage unit 240 is not limited to being the aforementioned containers, but may be a container such as a pickup box disposed in a room. Further, the shape of the container is not limited, and a predetermined space may be used as the article storage unit 240.

The mobile unit 250 is a mobile apparatus for moving the mobile body 200 in an environment. The mobile unit 250 may include, for example, a plurality of wheels provided on a bottom surface of the mobile body 200. The mobile unit 250 moves the mobile body 200 in a direction desired by a user by rotating the plurality of wheels when the user pushes the mobile body 200.

Next, the configuration of the article pickup robot 100 will be described. The article pickup robot 100 is a robot that autonomously moves in an environment and picks up pickup objects. As shown in FIG. 2, the article pickup robot 100 includes a sensor 120, a pickup unit 130, a mobile unit 140, and a control apparatus 110.

Figure 4:
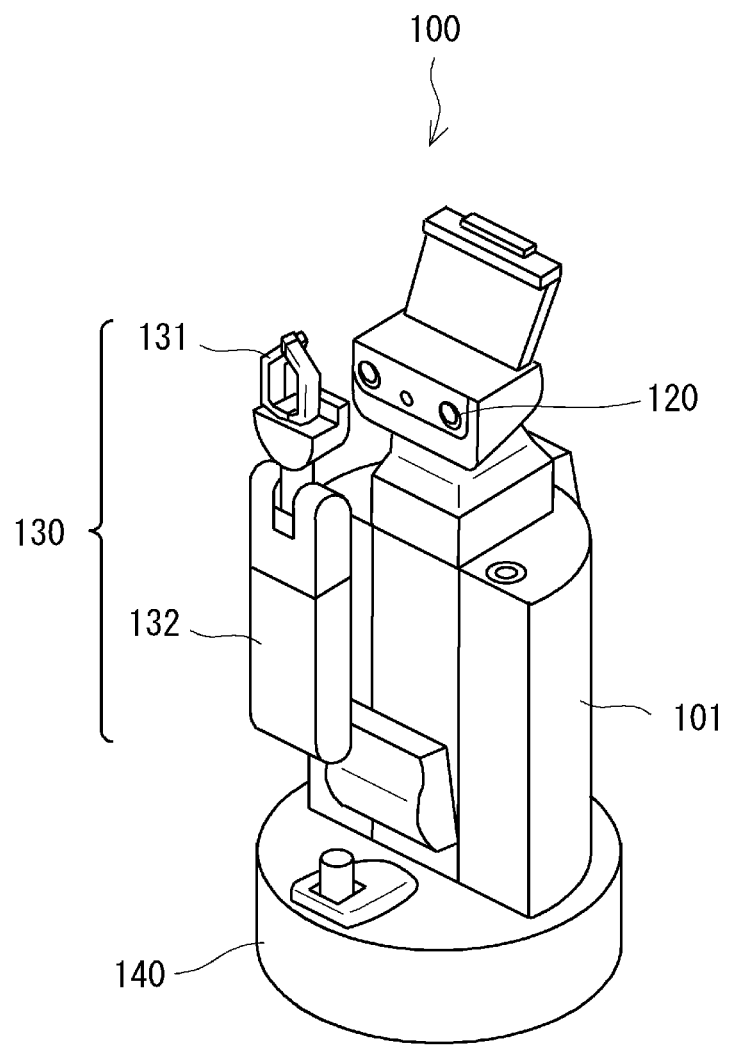
FIG. 4 is a diagram showing an example of an external appearance of an article pickup robot according to the embodiment.

FIG. 4 is a diagram showing an example of an external appearance of the article pickup robot 100.

The sensor 120 captures the environment from a predetermined direction, acquires information about the captured object, and outputs a result of the acquisition to the control apparatus 110. The sensor 120 may include, for example, a two-dimensional camera or a three-dimensional camera. The sensor 120 may include, for example, a camera (an RGB-D camera, a stereo camera), a laser range finder, an ultrasonic sensor, and a three-dimensional range sensor. As shown in FIG. 4, the sensor 120 is provided in, but is not limited to, a head part of the article pickup robot 100. A plurality of sensors 120 may be provided in the article pickup robot 100. The predetermined direction is, for example, a direction in which the head part of the article pickup robot 100 provided with the sensor 120 faces, but it is not limited thereto.

The sensor 120 acquires position information of the mobile body 200 through image recognition or the like for the captured image. The position information of the mobile body 200 may be information indicating a position of the mobile body 200 relative to the article pickup robot 100. The position information of the mobile body 200 may include information about a direction of the mobile body 200 with respect to the article pickup robot 100 and a distance between the mobile body 200 and the article pickup robot 100. The sensor 120 outputs the acquired position information of the mobile body 200 to a camera position acquisition unit 150.

Further, the sensor 120 acquires posture information indicating a posture of the mobile body 200. The posture information of the mobile body 200 may include information indicating what posture the mobile body 200 is taking and which direction the mobile body 200 is facing. The sensor 120 outputs the acquired posture information of the mobile body 200 to the camera position acquisition unit 150.

In a manner similar to that in the case described above, the sensor 120 may capture an image of a floor surface or the like and acquire position information and posture information of the pickup object through image recognition or the like. The sensor 120 can output the acquired position information and posture information of the pickup object to an article position specification unit 170.

Referring back to FIG. 2, the description will be continued. The pickup unit 130 picks up pickup objects in the environment. As shown in FIG. 4, for example, the pickup unit 130 includes an arm 132 supported by a main body 101 of the article pickup robot 100, and a hand 131 provided at a front end of the arm 132. The arm 132 is configured as, for example, an articulated arm. The arm 132 is provided on, but is not limited thereto, a front surface of the main body 101, and may instead be provided on a side surface of the main body 101. Regarding the arm 132, a driving mechanism (not shown) including a motor or the like operates in accordance with a control signal from a pickup operation control unit 180, to thereby change a position and a posture of the arm 132. The arm 132 may be configured so that its length is changed by extending and contracting it.

The hand 131 grasps the pickup object in accordance with a control signal from the pickup operation control unit 180. Regarding the hand 131, a driving mechanism (not shown) including a motor or the like operates, to thereby change a position and a posture of the hand 131. As shown in FIG. 4, the hand 131 may be, for example, a two-finger hand including a pair of grasping members such as two human fingers, or a three-finger hand, or a multi-finger hand having more than three fingers. The hand 131 is not limited to these ones, and may instead be one that adsorbs pickup objects. When the pickup object is a metallic one or the like, a hand using a magnet may be used. The hand 131 is not limited to the above ones, and various types of hand effectors capable of picking up pickup objects from the environment may instead be used as the hand 131.

Referring back to FIG. 2, the description will be continued. The mobile unit 140 is a mobile apparatus that moves the article pickup robot 100 in an environment. The mobile unit 140 moves the article pickup robot 100 to a specified position of the pickup object. Further, the mobile unit 140 moves the article pickup robot 100 while the pickup unit 130 is grasping the article.

The mobile unit 140 includes, for example, a pair of two driving wheels facing each other and a pair of two driven wheels rotatable in the left and right directions, and is configured so that it can move in all directions in accordance with a control signal. By rotationally driving each of the driving wheels, the mobile unit 140 can perform any traveling of the article pickup robot 100 such as forward and backward traveling, right and left turning, acceleration and deceleration, and stopping. The mobile unit 140 enables movement of the article pickup robot 100 by operating a driving mechanism (not shown) composed of a motor or the like in accordance with a control signal from the pickup operation control unit 180.

The control apparatus 110 controls an operation of the article pickup robot 100. The control apparatus 110 receives an instruction from a user and starts pickup based on the instruction. The control apparatus 110, for example, is incorporated in the main body 101, but is not limited thereto, and may instead be provided in other parts of the article pickup robot 100. The control apparatus 110 is formed by hardware mainly using a microcomputer including, for example, a Central Processing Unit (CPU) that performs control processing, arithmetic processing, and the like, and a storage unit composed of a Read Only Memory (ROM) and a RAM (Random Access Memory) that store a control program and an arithmetic program, processing data, and the like executed by the CPU. As shown in FIG. 2, the control apparatus 110 includes the camera position acquisition unit 150, the article position specification unit 170, and the pickup operation control unit 180.

The camera position acquisition unit 150 detects the camera 230 and then acquires position information of the camera 230. In this embodiment, the camera position acquisition unit 150 detects the mobile body 200 and then acquires position information of the mobile body 200, to thereby acquire position information of the camera 230 fixed to the mobile body 200. The camera position acquisition unit 150 is not limited to having the above configuration, and may directly detect the camera 230 and then acquire position information of the camera 230.

When the article pickup processing is performed, the control apparatus 110 registers in advance mobile body recognition image data for recognizing the mobile body 200 in a storage unit (not shown). The mobile body recognition image data is, for example, image data acquired by capturing an external appearance of the mobile body 200. The mobile body recognition image data may include image data of the mobile body 200 captured from a plurality of directions. The mobile body recognition image data may include information such as the shape, size, or color of the mobile body 200. As described above, by registering the mobile body recognition image data, the article pickup robot 100 can detect the mobile body 200 in various environments. Therefore, for example, even when the article pickup processing is performed in a plurality of rooms, it is not necessary to change the setting for each room.

The mobile body recognition image data may be registered in the control apparatus 110 by capturing the mobile body 200 using the sensor 120 or the like, or the image data acquired by a user using any camera may be registered through the operation terminal 210.

Note that, in order to recognize the mobile body 200, an image of the external appearance of the mobile body 200 is registered as mobile body recognition image data. However, the present disclosure is not limited thereto. Image data including appearance information of the camera 230 may be registered in the control apparatus 110 as camera recognition image data for recognizing the camera 230. By the above, it is not necessary to perform the setting again even when the camera 230 is mounted on another mobile body 200.

After the article pickup processing is started, the camera position acquisition unit 150 acquires image data in the environment acquired by the sensor 120. The camera position acquisition unit 150 refers to the mobile body recognition image data and recognizes the mobile body 200 from the acquired image data. The camera position acquisition unit 150 acquires position information and posture information of the recognized mobile body 200 from the sensor 120. The position information of the mobile body 200 may be a position relative to the article pickup robot 100. Since the camera 230 moves together with the mobile body 200, the camera position acquisition unit 150 can acquire the position information and the posture information of the camera 230 based on the position information and the posture information of the mobile body 200. The camera position acquisition unit 150 outputs the acquired position information and posture information of the camera 230 to the article position specification unit 170.

The article position specification unit 170 acquires the position information and the posture information of the camera 230 from the camera position acquisition unit 150. The article position specification unit 170 specifies the position of the pickup object based on the acquired position information of the camera 230 and the acquired posture information of the camera 230. The article position specification unit 170 can specify the position of the pickup object displayed on the display unit 220 by knowing the position of the camera 230 relative to the article pickup robot 100 and the capturing range of the camera 230 from the above information pieces.

The article position specification unit 170 may specify the position of the pickup object in more detail based on the position information of the pickup object relative to the mobile body 200 transmitted from the operation terminal 210. By the above, the article pickup robot 100 can move more accurately.

Further, the article position specification unit 170 may specify the position of the pickup object in more detail by using external appearance information of the pickup object transmitted from the operation terminal 210. For example, the article pickup robot 100 captures, by using the sensor 120, an image of a floor surface at the position to which the article pickup robot 100 has moved, and acquires image data of the floor surface. The article position specification unit 170 recognizes the pickup objects from the image data of the floor surface, and acquires the positional information of each of the pickup objects relative to the article pickup robot 100. The article position specification unit 170 may compare the position information of the pickup object acquired here with the position information of the pickup object transmitted from the operation terminal 210 based on the external appearance information of each pickup object, and if there is a difference between them, the article position specification unit 170 may correct the position information of the pickup object. By the above, it is possible to specify pickup objects selected by a user without error and pick up them.

Note that the article position specification unit 170 may specify an approximate position of the pickup object, for example, by using only the position information of the camera 230. When the article pickup robot 100 has moved to the approximate position of the pickup object, the article position specification unit 170 may specify a more accurate position of the pickup object by using the sensor 120.

The article position specification unit 170 outputs the specified position information of the pickup object to the pickup operation control unit 180.

The pickup operation control unit 180 controls operations of the pickup unit 130 and the mobile unit 140. The pickup operation control unit 180 acquires the position information of the pickup object from the article position specification unit 170. The pickup operation control unit 180 outputs a control signal to the mobile unit 140 so as to move the article pickup robot 100 based on the acquired position information of the pickup object. Further, the pickup operation control unit 180 outputs a control signal to the pickup unit 130 so as to pick up the pickup object at the position to which the article pickup robot 100 has moved.

Next, the article pickup processing according to this embodiment will be described with reference to the flowcharts shown in FIGS. 5 and 6.

Figure 5:
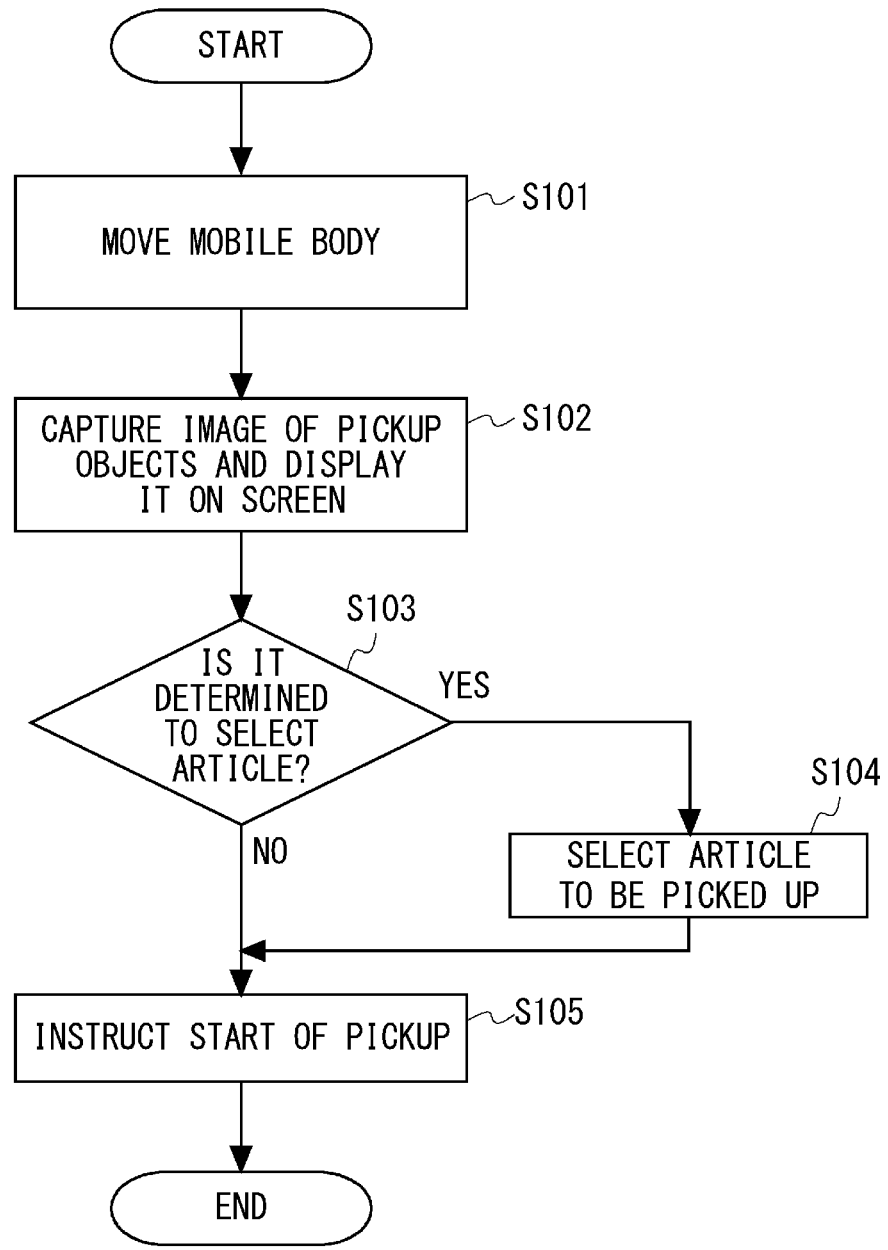
FIG. 5 is a flowchart showing processing performed by a user according the embodiment.

FIG. 5 is a flowchart showing an operation performed by a user. First, a user moves the mobile body 200 (see FIGS. 1 and 2) to a desired position (S101). The user captures an image of a floor surface or the like including pickup objects by using the camera 230, and checks image data displayed on the display unit 220 (S102). The user selects (i.e., determines) whether or not to select an article to be picked up by the article pickup robot 100 from the displayed articles (S103). If the user determines to select an article (YES in S103), the user selects an article to be picked up (S104). If the user determines not to select an article (NO in S103), the user instructs the article pickup robot 100 to pick up the articles (S105).

Figure 6:
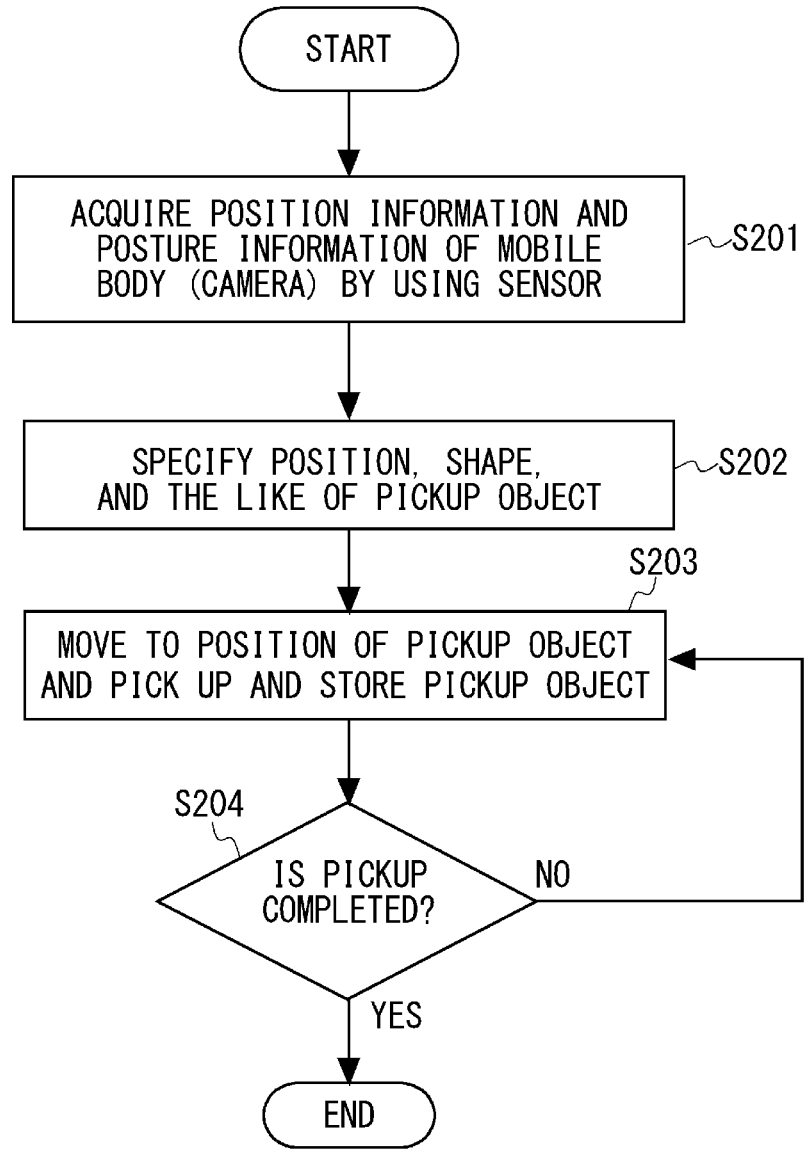
FIG. 6 is a flowchart showing processing performed by the article pickup robot according to the embodiment.

FIG. 6 is a flowchart showing processing performed by the article pickup robot 100. The article pickup robot 100 starts article pickup processing in response to an instruction from the user. The article pickup robot 100 acquires position information and posture information of the mobile body 200 by using the sensor 120 (S201). The article pickup robot 100 acquires position information and posture information of the camera 230 by using the position information and the posture information of the mobile body 200. The article pickup robot 100 specifies a position of the pickup object based on the position information and the posture information of the camera 230 (S202). The article pickup robot 100 may specify a shape and the like of the pickup object in addition to the position thereof. The article pickup robot 100 moves based on the specified position of the pickup object and picks up the pickup object, and stores it in the storage unit (S203). The article pickup robot 100 determines whether or not the pickup of the pickup objects is completed (S204). If the pickup is not completed (NO in S204), the processing of Step S203 is repeated. If the pickup is completed (YES in S204), the processing is ended.

As described above, in the article pickup system 1000 according to this embodiment, the pickup objects in the environment are captured using the camera 230 provided in the mobile body 200, and the acquired image data is displayed on the display unit 220. Since the article pickup robot 100 can specify the positional relation between it and the mobile body 200 by using the sensor 120 and specify the position of the camera 230, it can specify the position of the pickup object. The article pickup robot 100 can move to the specified position and pick up the pickup object.

Since a user can move the camera 230 to a desired place together with the mobile body 200, the article to be picked up by the article pickup robot 100 can be captured at any place. Therefore, all the pickup objects can be picked up without a blind spot of the camera 230 being generated. By the above, it is possible to pick up articles in the environment by one camera without providing a plurality of fixed cameras. Further, since the camera 230 can be moved close to the pickup object, it may have a lower resolution than that of a camera fixed on a ceiling or the like. Therefore, it is possible to reduce the cost.

Further, when there are articles which a user does not want to pick up, the user can capture an image so as not to include these articles therein. Further, even when articles which a user does not want to pick up are included in the capturing range, it is possible to select whether or not to perform a pickup for each separate article. Thus, there is no possibility of articles being erroneously picked up. Further, since the number of articles included in the capturing range is smaller than that in the case in which a ceiling camera is used, a user can easily select articles.

In the article pickup processing described above, the article pickup robot 100 and the mobile body 200 are located relatively close to each other. Thus, it is possible to reduce a movement distance for picking up a plurality of pickup objects. By the above, it is possible to reduce the time required for the entire article pickup processing. Further, since a user can move the mobile body 200 to various environments, the user can allow the robot to perform the article pickup processing in a plurality of rooms without any additional cost, unlike in the case in which the fixed camera is used. As described above, by the article pickup system 1000 according to this embodiment, it is possible to efficiently pick up articles.

Example of Hardware Configuration

The functional components of the article pickup robot 100 and the operation terminal 210 may be implemented by hardware (e.g., a hard-wired electronic circuit) or a combination of hardware and software (e.g., a combination of an electronic circuit and a program for controlling the electronic circuit). A case in which the functional components of the article pickup robot 100 and the like are implemented by a combination of hardware and software will be further described below.

Figure 7:
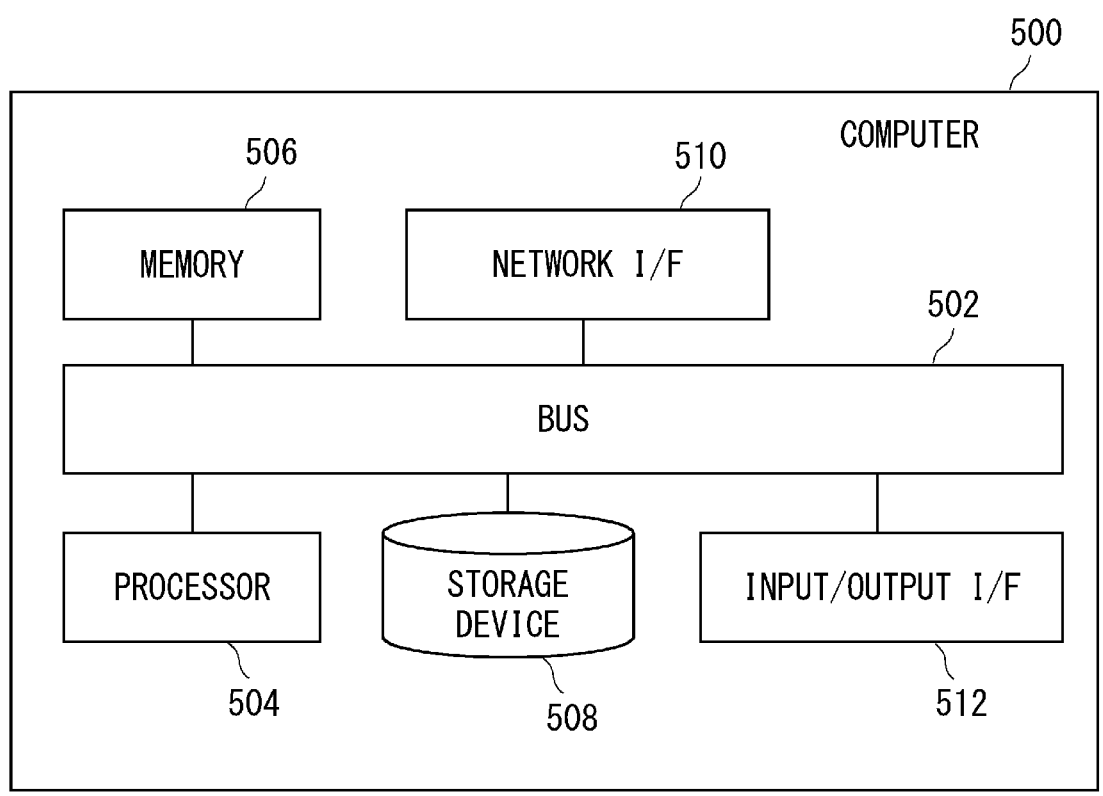
FIG. 7 is a diagram showing a configuration example of hardware of the article pickup robot or the like according to the embodiment.

FIG. 7 is a block diagram showing a hardware configuration of a computer 500 that implements the article pickup robot 100 and the like. The computer 500 may be a dedicated computer designed to implement the article pickup robot 100 and the like, or a general-purpose computer. The computer 500 may be a portable computer such as a smartphone or tablet terminal.

For example, by installing a predetermined application to the computer 500, the functions of the article pickup robot 100 and the like are implemented in the computer 500. The aforementioned application is configured by a program for implementing the functional components of the article pickup robot 100 and the like.

The computer 500 includes a bus 502, a processor 504, a memory 506, a storage device 508, an input/output interface 510, and a network interface 512. The bus 502 is a data transmission line through which the processor 504, the memory 506, the storage device 508, the input/output interface 510, and the network interface 512 transmit and receive data to and from each other. However, a method for connecting the processor 504 and the like to each other is not limited to the method for connecting these to each other by the bus.

The processor 504 may be any of various types of processors, such as a Central Processing Unit (CPU), a Graphics Processing Unit (GPU), or a Field-Programmable Gate Array (FPGA). The memory 506 is a main storage device implemented using Random Access Memory (RAM) or the like. The storage device 508 is an auxiliary storage device implemented using a hard disk, a Solid State Drive (SSD), a memory card, or a Read Only Memory (ROM).

The input/output interface 510 is an interface for connecting the computer 500 to an input/output device. For example, an input device, such as a keyboard, and an output device, such as a display apparatus, are connected to the input/output interface 510.

The network interface 512 is an interface for connecting the computer 500 to a network. This network may be a Local Area Network (LAN) or a Wide Area Network (WAN).

The storage device 508 stores the program (the above-described program for implementing the application) for implementing the functional components of the article pickup robot 100 and the like. The processor 504 loads this program into the memory 506 and executes the loaded program, thereby implementing the functional components of the article pickup robot 100 and the like.

Each of the processors executes one or a plurality of programs including instructions to cause a computer to perform an algorithm. This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disks, etc.), optical magnetic storage media (such as magneto-optical disks), optical disc media (such as CD (compact disc), DVD (digital versatile disc), etc.), and semiconductor memories (such as mask ROM (read only memory), PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiment and may be changed as appropriate without departing from the spirit of the present disclosure.

For example, in the above description, although the positional relation between the article pickup robot 100 and the mobile body 200 is specified in the article pickup robot 100, the present disclosure is not limited to this, and the positional relation may instead be specified in the operation terminal 210 of the mobile body 200. For example, the camera 230 may capture an image of the article pickup robot 100 and recognize the article pickup robot 100 by using image recognition, to thereby determine the position of the article pickup robot 100 relative to the mobile body 200.

Further, in the above description, although a method in which a user pushes the mobile body 200 such as a wagon by hand to thereby move the mobile body 200 is used, the present disclosure is not limited thereto. The mobile body 200 may be a robot capable of moving autonomously. Further, a plurality of article pickup robots 100 and a plurality of mobile bodies 200 may be used. By the above, it is possible to further reduce the burden on a user From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An article pickup system comprising:
a mobile body configured to move in an environment where a plurality of articles to be picked up are present, the mobile body having a camera configured to acquire image data by capturing the plurality of articles; and
an article pickup robot configured to move in the environment and pick up the plurality of captured articles, wherein
the article pickup robot comprises:
an article pickup robot camera configured to capture an environment image of the environment;
a camera position acquisition unit configured to acquire camera recognition image data which is image data including appearance information of the camera, detect the camera based on the camera recognition image data and the environment image, and then acquire position information of the detected camera;
an article position specification unit configured to specify positions of the plurality of articles based on the position information of the camera;
a mobile unit configured to move to the specified positions; and
a pickup unit configured to pick up the plurality of articles at the positions to which the mobile unit has moved.

2. The article pickup system according to claim 1, wherein
the camera position acquisition unit further acquires posture information indicating a posture of the camera, and
the article position specification unit specifies the positions of the plurality of articles based on the position information and the posture information.

3. The article pickup system according to claim 1, further comprising a display apparatus configured to display the image data,
wherein the display apparatus is movable together with the camera in the environment.

4. The article pickup system according to claim 3, wherein the article pickup robot receives a selection of the article to be picked up from among the displayed image data from a user and picks up the selected article.

5. The article pickup system according to claim 1, wherein
the mobile body further comprises a pickup container capable of storing the plurality of articles, and
the article pickup robot picks up the plurality of articles and puts them in the pickup container.

6. The article pickup system according to claim 1, wherein:
the article pickup robot camera is further configured to capture an image of an external appearance of the mobile body;
the article pickup robot includes a central processing unit configured to acquire mobile body recognition image data which includes image data of the mobile body captured of the external appearance of the mobile body and recognize the mobile body from the acquired mobile body recognition image data.

7. The article pickup system according to claim 1 further comprising:
a central processing unit that includes the camera position acquisition unit and the article position specification unit,
wherein the mobile unit includes a pair of drive wheels, and
wherein the pickup unit includes an articulated arm.

8. The article pickup robot according to claim 1 further comprising:
a central processing unit that includes the camera position acquisition unit and the article position specification unit,
wherein the mobile unit includes a pair of drive wheels, and
wherein the pickup unit includes an articulated arm.

9. An article pickup robot comprising:
an article pickup robot camera configured to capture an environment image of an environment;
a camera position acquisition unit configured to acquire camera recognition image data which is image data including appearance information of the camera, detect a camera based on the camera recognition image data and the environment image, and then acquire position information of the detected camera, the camera being configured to acquire image data by capturing a plurality of articles to be picked up;
an article position specification unit configured to specify positions of the plurality of captured articles based on the position information of the camera;
a mobile unit configured to move to the specified positions; and
a pickup unit configured to pick up the plurality of articles at the positions to which the mobile unit has moved,
wherein the camera is provided in a mobile body capable of moving in the environment where the plurality of articles are present.

10. The article pickup robot according to claim 9, wherein:
the article pickup robot camera is further configured to capture an image of an external appearance of the mobile body, and
the article pickup robot includes a central processing unit configured to acquire mobile body recognition image data which includes image data of the mobile body captured of the external appearance of the mobile body and recognize the mobile body from the acquired mobile body recognition image data.

11. An article pickup method comprising:
- capturing an environment image of an environment by an article pickup robot camera;
- acquiring camera recognition image data which is image data including appearance information of a camera;
- detecting the camera based on the camera recognition image data and the environment image, and then acquiring position information of the detected camera, the detected camera being configured to acquire image data by capturing a plurality of articles to be picked up;
- specifying positions of the plurality of captured articles based on the position information of the detected camera;
- moving a mobile unit to the specified positions; and
- picking up the plurality of articles at the positons to which the mobile unit has moved,
- wherein the detected camera is provided in a mobile body, the mobile body being capable of moving in an environment where the plurality of articles are present.

12. The article pickup method according to claim 11, further comprising:
- capturing an image of an external appearance of the mobile body by the article pickup robot camera;
- acquiring mobile body recognition image data, the mobile body recognition image data includes image data of the mobile body captured of the external appearance of the mobile body; and
- recognizing the mobile body by the control apparatus from the acquired mobile body recognition image data.

13. The article pickup method according to claim 11, wherein the mobile unit includes a pair of drive wheels, and
- wherein the pickup unit includes an articulated arm.

14. A non-transitory computer readable medium storing an article pickup program for causing a computer to execute:
- processing of capturing an environment image of an environment by an article pickup robot camera;
- processing of acquiring camera recognition image data which is image data including appearance information of a camera;
- processing of detecting the camera based on the camera recognition image data and the environment image; and
- processing of acquiring position information of the detected camera, the detected camera being configured to acquire image data by capturing a plurality of articles to be picked up;
- processing of specifying positions of the plurality of captured articles based on the position information of the detected camera;
- processing of moving a mobile unit to the specified positions; and
- processing of picking up the plurality of articles at the positions to which the mobile unit has moved,
- wherein the detected camera is provided in a mobile body, the mobile body capable of moving in an environment where the plurality of articles are present.

15. The non-transitory computer readable medium article pickup system according to claim 14, further comprising:
- processing of capturing an image of an external appearance of the mobile body by the article pickup robot camera;
- processing of acquiring mobile body recognition image data, the mobile body recognition image data includes image data of the mobile body captured of the external appearance of the mobile body; and
- processing of recognizing the mobile body by the control apparatus from the acquired mobile body recognition image data.

* * * * *